United States Patent [19]

Thebault et al.

[11] Patent Number: 5,732,114
[45] Date of Patent: Mar. 24, 1998

[54] METHOD OF DETECTING REFERENCE SYMBOLS FOR A DIGITAL DATA RECEIVER

[75] Inventors: Bertrand Thebault, Montauban de Bretagne; Philippe Sehier, Levallois Perret, both of France

[73] Assignee: Alcatel Telspace, Nanterre Cedex, France

[21] Appl. No.: 551,940

[22] Filed: Nov. 2, 1995

[30] Foreign Application Priority Data

Nov. 7, 1994 [FR] France ................... 94 13318

[51] Int. Cl.$^6$ ................................... H04L 7/00
[52] U.S. Cl. ........................... 375/368; 375/343
[58] Field of Search ....................... 375/354, 368, 375/365, 366, 342, 343, 367, 210

[56] References Cited

U.S. PATENT DOCUMENTS 5,590,160  12/1996  Ostman ................... 375/367
5,598,429  1/1997   Marshall ................. 375/367

FOREIGN PATENT DOCUMENTS

0410532A1  1/1991  European Pat. Off. .
2342598    9/1977  France .
WO9107831  5/1991  WIPO .

OTHER PUBLICATIONS

Patent Abstracts of Japan, vol. 10, No. 164 (E-410), Jun. 11, 1986 corresponding to JP-A-61 016655 (Fujitsu KK) 24 Jan. 1986.

*Primary Examiner*—T. Ghebretinsae
*Attorney, Agent, or Firm*—Sughrue, Mion, Zinn, Macpeak & Seas, PLLC

[57] ABSTRACT

In a method of detecting reference symbols in a digital data stream constituted by successive frames, each frame contains R reference symbols and I information symbols, and the R reference symbols are uniformly spaced apart in the digital data stream. The received signal is sampled with a period $T_e=T_s/N_e$, where $N_e$ is an integer not less than 2, and $T_s$ is the symbol time. A cross-correlation is calculated, with each calculated cross-correlation supplying a magnitude $I_n$ equal to:

$$I_n = \sum_{k=0}^{q-1} \left| \sum_{d=kr}^{(k+1)r-1} x_{n+dN_e} S^*_{d,k} \right|$$

where $x_{n+dN_e}$ represents the sample received at instant $n+dN_e$, $S^*_{d,k}$ represents the complex conjugate of the reference symbol of index d, $k \in \{0, \ldots, R-1\}$ and represents frame index, $r=R/q$, where q is an integer not less than 1. The cross-correlations are summed over M frames so as to form energy levels $J_{M,d}$ equal to:

$$J_{M,d} = \sum_{m=0}^{M-1} I_{mN_e(R+I)+d}$$

where m is the frame index, M is the number of sums performed, and $d \in \{0, \ldots, N_e(R+I)-1\}$. The method further includes a step of detecting the maximum energy level $J_{M,D}=\text{MAX}_d J_{M,d}$, the position D of the maximum energy level corresponding to the positions of the reference symbols in the received frames.

4 Claims, 3 Drawing Sheets

METHOD OF DETECTING REFERENCE SYMBOLS FOR A DIGITAL DATA RECEIVER

The invention relates to digital data transmission, and it relates more particularly to a method of detecting reference symbols for a receiver receiving a digital data stream, e.g. transmitted via a radio link. The invention is applicable to any type of phase modulation (M-PSK: phase shift keying with M phase states) and/or of amplitude modulation (M-APSK: amplitude and phase shift keying with M states) as applied to a continuous digital stream containing reference symbols, and the invention is particularly applicable to rate recovery apparatus.

BACKGROUND OF THE INVENTION

When a digital data stream is transmitted to a receiver, the receiver must perform clock recovery, referred to as "rate recovery", so as to sample the received signal at optimum instants, i.e. when the eye diagram of the received signal is at its widest open. In the present invention, the received data stream is continuous over time, and is in the form shown in FIG. 1.

FIG. 1 shows a portion of a digital stream 10 as considered in the present invention. The digital stream 10 is made up of successive and continuous frames, each frame containing R reference symbols and I information symbols (useful data). At the transmitter of such a stream 10, R reference symbols are inserted every I information symbols, and the R reference symbols are thus uniformly spaced apart in the stream 10. The R and I symbols have a symbol period $T_s$.

In the state of the art, the R reference symbols are identical from one frame to another, and, after transposing them into baseband, the receiver correlates the R received reference symbols with a local reference sequence that is identical to the reference sequence of the transmitter, so as to detect the positions of the R reference symbols. The reference symbols constitute a frame alignment word (FAW) contained in the preambles of transmitted packets. Usually, the receiver over-samples the received signal, i.e. the received digital data stream is sampled with a period $T_e=T_s/N_e$, where $N_e$ is an integer not less than 2.

The limits of that type of synchronization seeking are reached when transmission is noisy. It is then no longer possible to synchronize on each frame alignment word, unless the FAW is lengthened. In which case, frame efficiency is reduced because insertion losses increase.

OBJECTS AND SUMMARY OF THE INVENTION

A particular object of the present invention is to mitigate that drawback. More precisely, an object of the invention is to provide a method of detecting reference signals that are uniformly inserted in a digital stream, whereby the ratio between the number I of items of useful data and the number R of reference symbols is large, i.e. whereby insertion losses are low.

This object and others that appear below are achieved by providing a method in which a cross-correlation is calculated every $T_e$ on successive frames, each calculated cross-correlation supplying a magnitude $I_n$ equal to:

$$I_n = \sum_{k=0}^{q-1} \left| \sum_{d=kr}^{(k+1)r-1} x_{n+dNe} S^*_{d,k} \right|$$

where $x_{n+dNe}$ represents the sample received at instant n+dNe, $S^*_{d,k}$ represents the complex conjugate of the reference symbol of index d, k ∈ {0, ..., R−1} and represents the frame index, r=R/q, where q is an integer not less than 1, said cross-correlations being summed over M frames so as to form energy levels $J_{M,d}$ equal to:

$$J_{M,d} = \sum_{m=0}^{M-1} I_{mNe(R+I)+d}$$

where m is the frame index, M is the number of sums performed, and where d ∈ (0, ..., $N_e(R+I)-1$}, the method further including a step of detecting the largest of the quantities $J_{M,D}=MAX_d J_{M,d}$, the position D of the maximum corresponding to the positions of the reference symbols in the received frames.

The invention also provides apparatus for implementing the method, it being possible for the apparatus to co-operate with synchronization tracking apparatus so as to form rate recovery apparatus.

BRIEF DESCRIPTION OF THE DRAWINGS

Other characteristics and advantages of the invention appear on reading the following description of a preferred implementation given by way of non-limiting example and with reference to the accompanying drawings, in which.

MORE DETAILED DESCRIPTION

Figure 1:
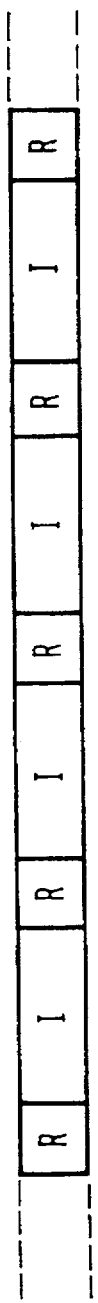
FIG. 1 represents a portion of a digital stream as considered in the present invention.

FIG. 1 is described above with reference to the state of the art.

Figure 2:
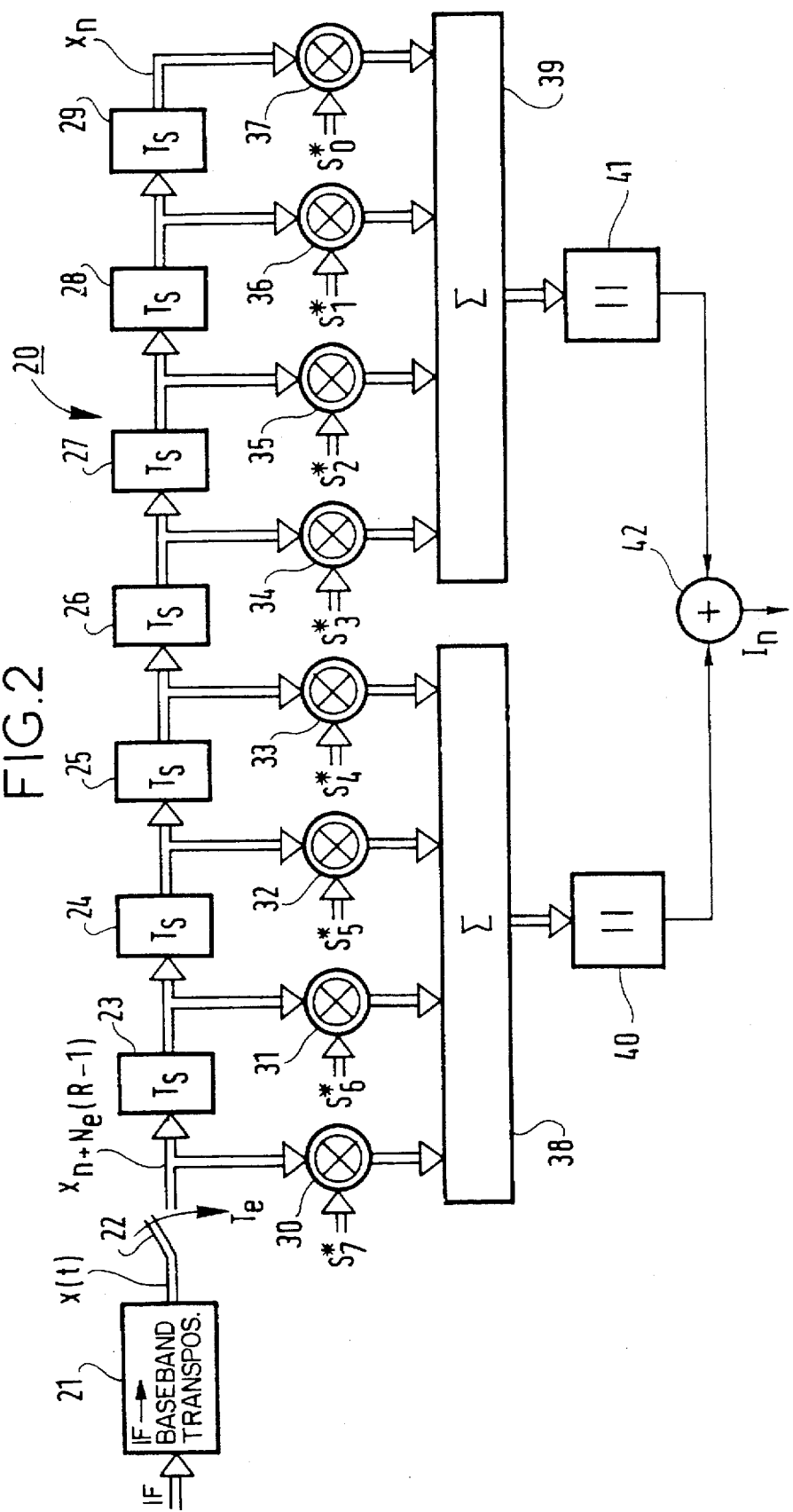
FIG. 2 is a block diagram of a preferred implementation of the method of the invention, showing apparatus cross-correlating received samples with samples of a local sequence.

FIG. 2 is a diagram of a preferred implementation of the invention, showing apparatus for cross-correlating the received samples with the samples of a local sequence. In this example, the apparatus is adapted for a number R of reference symbols equal to 8.

The apparatus shown in FIG. 2, given overall reference 20, includes a module 21 for transposing the received IF signal into baseband by means of an oscillator that is free-running, i.e. that is not servo-controlled. As described below, rate synchronization is performed on the non-synchronized signal in carrier phase.

The signal as received, filtered and transposed into baseband by the module 21 may be written as follows:

$$x(t) = \sum_{k=0}^{\infty} S_k g(t - kT_s) \exp(j\delta\omega t) + n(t)$$

where:

g(t) is a complex signal representing the equivalent in baseband of the impulse response of the transmission channel including the transmission and reception filters;

n(t) is a complex signal representing the Gaussian noise in baseband; and s(k) is the $k^{th}$ complex symbol transmitted by the transmitter.

The output signal of the module 21 is sampled with $T_e$, where $N_e T_e = T_s$, $T_s$ being the symbol time, and $N_e$ being an integer not less than 2. In this way, over-sampling is performed with $N_e$ times the symbol frequency. The sampled signal may be written as follows:

$$x_d = x(dT_e) = = \sum_{k=0}^{\infty} S_k g(dT_e - kT_s) \exp(j\delta\omega dT_e) + n(dT_e)$$

The term $\exp(j\delta\omega dT_e)$ characterizes the carrier rotation, $\delta$ is the frequency difference (which might be affected by Doppler) between the transmission frequency synthesizer and the reception frequency synthesizer, d is the number of symbols sampled per frame ($d=N_e(R+I)$), $n(dT_e)$ is the Gaussian noise, and $S_{kg}(dT_e - kT_s)$ represents the complex samples.

In the invention, the cross-correlations are calculated for each received frame, and they are summed over a plurality of frames. For this purpose, the sampled signal is applied to sets of bistables 23 to 29, each set of bistables comprising $N_e$ elementary bistables clocked at period $T_e$. The symbols referenced $X_{n+Ne}(R-1)$ to $x_n$ are applied to complex multipliers 30 to 37 supplying correlation values to summing circuits 38 and 39. Two summing circuits are used in this example, each of which is followed by an absolute-value circuit 40, 41. Thus, at each time $T_e$, a correlation is calculated between the sampled sequence and a local sequence containing the complex conjugate elements of the sequence of the R symbols. The complex conjugate symbols are referenced $S^*_d(S^*_0$ to $S^*_7)$. For simplicity, it is assumed in this example that the R reference symbols are identical from one frame to the next, and they are referenced $S_d$, where $d \in \{0, \ldots, R-1\}$ with R=8.

In order to reduce sensitivity to carrier rotation as much as possible, the R reference symbols are subdivided into q groups of r symbols, q being an integer in this example equal to 2 (R=8 and r=4). The lower the number of symbols on which summing and integration are performed, the smaller the effect of carrier rotation on the results of said summing and of said integration, and therefore on synchronization acquisition.

The circuits 40 and 41 supply output signals which are summed in an adder 42 supplying a signal referenced $I_n$ which is in general equal to the following:

$$I_n = \sum_{k=0}^{q-1} \left| \sum_{d=kr}^{(k+1)r-1} x_n + dNeS^*_{d,k} \right|$$

The R reference symbols are generally referenced $S^*_{d,k}$ because they can be different from one frame to the next. However, it is advantageous to limit the periodicity of the reference symbols in the frames so as to achieve fast acquisition of synchronization. In which case, if the reference symbols are identical in the various frames, $S^*_{d,k}$ is equal to $S^*_d$.

The signal $I_n$ is a discrete signal that varies over time, at each $T_e$, and that has a peak when the local sequence is in phase with the sequence present in the received signal. In order to achieve acquisition, it is necessary to choose between the $N_e(R+I)$ possible positions of the received signal relative to the local sequence so as to select that one of said possible positions for which the energy is maximum detected. However, in the presence of noise, the calculation of the quantities $I_n$ is unreliable because it only relates to a small number of symbols (R=8 in the example in question). That is why the invention proposes to sum these quantities over a number M of frames so as to form energy levels $J_{M,d}$ equal to:

$$J_{M,d} = \sum_{m=0}^{M-1} I_{mNe(R+I)+d}$$

where m is the frame index, M is the number of successive sums performed, and $d \in \{0, \ldots, N_e(R+I)-1\}$. The M energy sums may be calculated by means of apparatus as shown in FIG. 3 which is a block diagram of a circuit for summing the values $I_n$ and for detecting the maximum sum.

Figure 3:
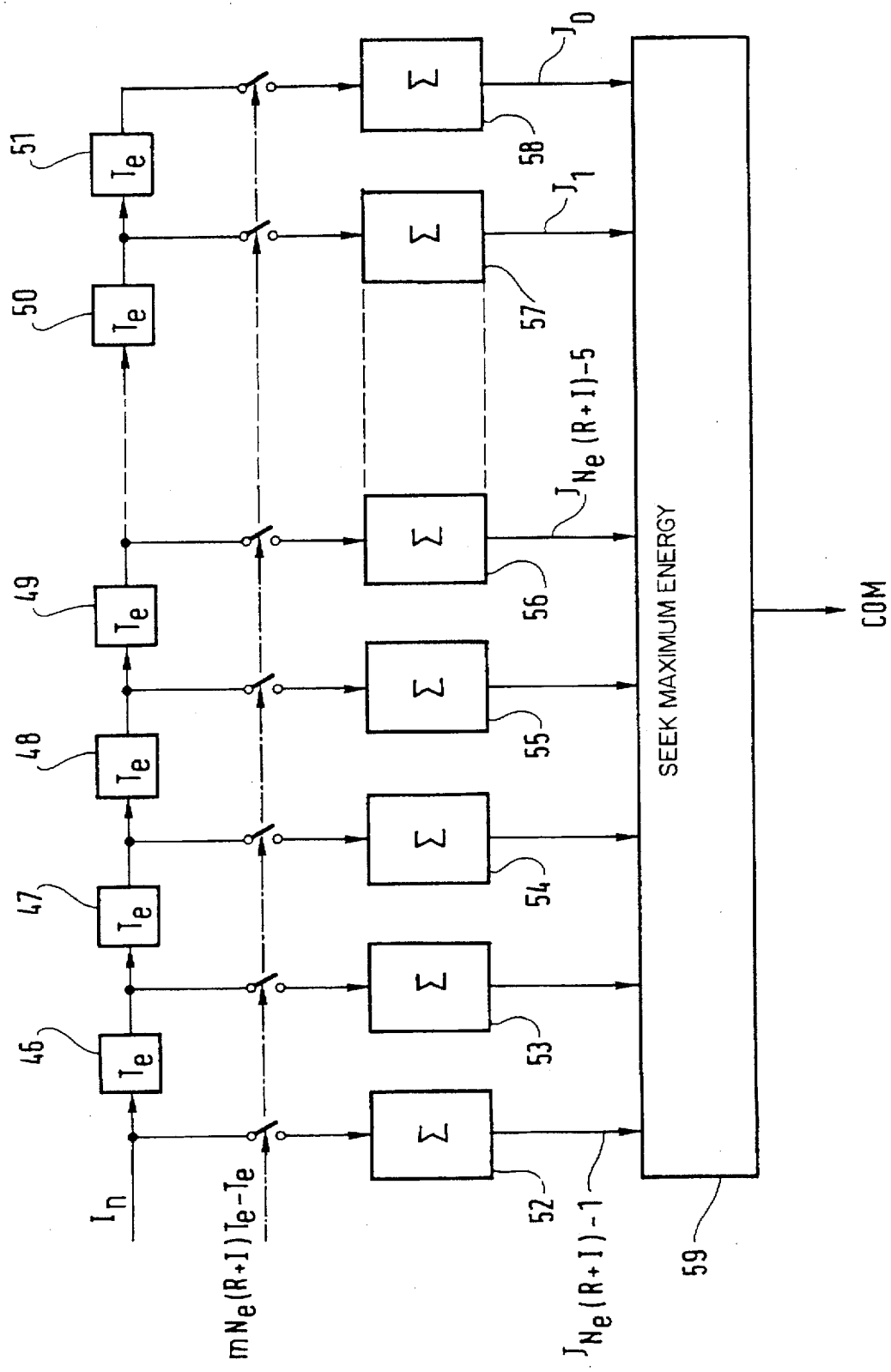
FIG. 3 is a block diagram of a circuit for summing the values $I_n$ of FIG. 2, and for detecting the maximum of the sums.

Every time $T_e$, the circuit shown in FIG. 3 receives a signal $I_n$ applied to a plurality of bistables 46 to 51 operating with the period $T_e$. The signal $I_n$ together with the output signals of the bistables are applied every $mN_e(R+I)T_e-T_e$ to corresponding accumulator devices 52 to 58, so as to apply to the accumulator devices energy values detected at the same instants in the m frames in question, e.g. successive frames. The results of the summing constitute the above-indicated energy levels $J_{M,d}$. The various energy levels are than applied to apparatus 59 for seeking the energy maximum, which apparatus seeks the time position D for which the following applies:

$$J_{M,D} = \text{MAX}_d J_{M,d} = \sum_{m=0}^{M-1} I_{mNe(R+I)+d}$$

The position D of the maximum is the position for which the energy maximum is detected and in which, for example, phase is synchronized with the beginning of a frame (when the R reference symbols are situated at the beginning of the frame). Once position D has been found, the apparatus 59 generates a command signal COM causing the origin of the reception frame to be shifted by the quantity D. For example, it is merely necessary to reset the counter that Governs the frame clock at the $(D-1)^{th}$ sample.

The above-described apparatus advantageously cooperates with synchronization tracking apparatus as described with reference to FIG. 4.

Figure 4:
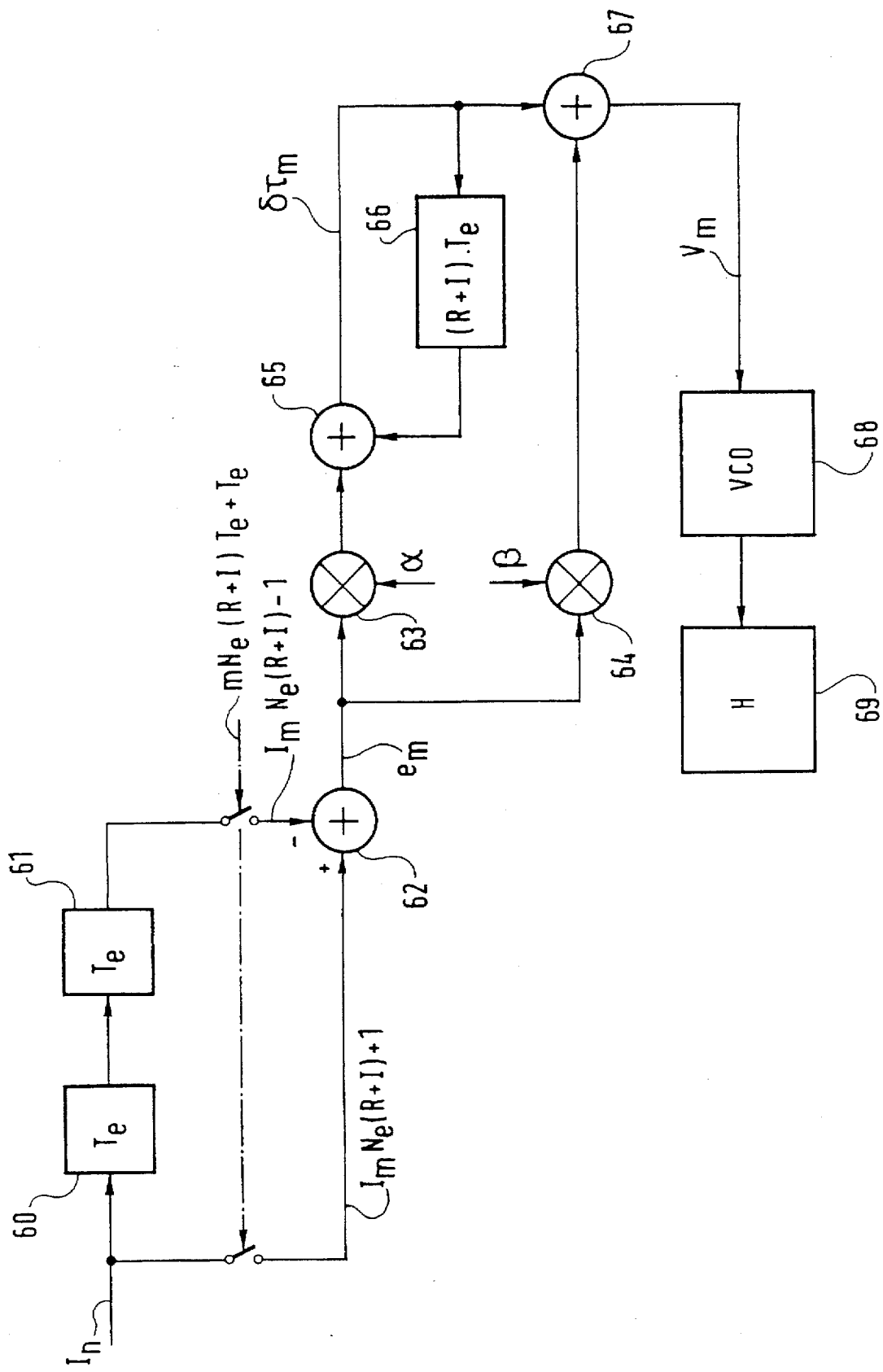
FIG. 4 is a block diagram of synchronization tracking apparatus that can be used to co-operate with the reference symbol detection apparatus shown in FIGS. 2 and 3.

The synchronization tracking apparatus shown in FIG. 4 includes an estimator supplying an error signal $e_m$ to a digital filter supplying a command signal $V_m$ applied to a local oscillator.

The estimator receives the values In calculated by the apparatus 20 shown in FIG. 2, and serves in particular to generate an error signal for each frame m, which error signal is constituted by the difference between two detected maxima on either side of the peak for which synchronization is optimum. For that purpose, the estimator includes two bistables 60 and 61 operating at the rate $T_e$ and whose outputs are applied at the rate $mN_e(R+I)T_e+T_e$ to a subtracter 62. The error $e_m$ is given by:

$$e_m = I_{mNe(R+I)+1} - I_{mNe(R+I)-1}$$

This error $e_m$ is applied to the digital filter which includes two multipliers 63, 64 receiving respective reference values α and β. The multiplier 63 supplies α.$e_m$ to a summing circuit 65 which has a delay circuit looped back on it for imparting a delay of duration (R+I).$T_e$. Thus, the rate time derivative $\delta\tau_m$ is obtained equal to:

$$\delta\tau_m = \delta\tau_{m-1} + \alpha.e_m$$

where α<<1

$\delta\tau_m$ is applied to a summing circuit 67 which also receives β.$e_m$ from the multiplier 64. The summing circuit 67 supplies a signal $V_m$ equal to:

$$V_m = \delta\tau_m + \beta e_m$$

where β<<1

The signal $V_m$ is applied to a voltage controlled oscillator (VCO) 68 followed by a circuit 69 for generating local clocks.

Naturally, the apparatus shown in FIG. 4 may be replaced with any digital filter performing interpolation between the supplied energy levels $I_n$ so as to correct the local clock and so as to track the rate of the received samples.

The main advantage of the invention is that rate synchronization is non-coherent because it is performed on the transmitted signal in baseband, with neither the phase nor the frequency difference between the transmission clock and the reception clock being compensated. As a result, any loss of synchronization of carrier recovery that might occur when useful information symbols are received has no effect on rate recovery. Moreover, by sub-dividing the cross-correlation calculation into groups of modules concerning small numbers of symbols (r=4), it is possible to achieve rate recovery even in the presence of Doppler of about 10% of the symbol frequency, when the Doppler occurs when reference symbols are received.

The apparatus of the invention offers high performance: in 2-PSK, it is possible to obtain rate acquisition and rate tracking for an energy per bit/noise spectrum density (Eb/No) of less than 0 dB.

We claim:

1. A method of detecting reference symbols in a digital data stream constituted by successive frames, each frame containing R reference symbols and I information symbols, said R reference symbols being uniformly spaced apart in said digital data stream, said method comprising the steps of:

calculating a cross-correlation between said digital data stream and a local reference sequence containing said reference symbols, so as to detect the positions of said R reference symbols in said digital data stream, said digital data stream being sampled with a period $T_e = T_s/N_e$, where $N_e$ is an integer not less than 2, and $T_s$ is the symbol time, wherein said cross-correlation is calculated every $T_e$ on successive frames, each calculated cross-correlation supplying a magnitude $I_n$ equal to:

$$I_n = \sum_{k=0}^{q-1} \left| \sum_{d=kr}^{(k+1)r-1} x_{n+dNe} S^*_{d,k} \right|$$

where $x_{n+dNe}$ represents the sample received at instant n+dNe, $S^*_{d,k}$ represents the complex conjugate of the reference symbol of index d, k ∈ {0, ..., R−1} and represents the frame index, r=R/q, where q is an integer not less than 1;

summing said cross-correlations over M frames so as to form energy levels $J_{M,d}$ equal to:

$$J_{M,d} = \sum_{m=0}^{M-1} I_{mNe(R+I)+d}$$

where m is the frame index, M is the number of sums performed, and where d ∈ {0, ..., $N_e$(R+1)−1}; and detecting a maximum energy level $J_{M,D}$ equal to $J_{M,D}$= MAX$_d$ $J_{M,d}$, the position D of the maximum energy level corresponding to the positions of said reference symbols in said received frames.

2. A method according to claim 1, wherein said R reference symbols are identical from one frame to another.

3. Apparatus for detecting reference symbols in a digital data stream constituted by successive frames, each frame containing R reference symbols and I information symbols, said R reference symbols being uniformly spaced apart in said digital data stream, the apparatus comprising:

a circuit which calculates a cross-correlation between said digital data stream and a local reference sequence containing said reference symbols, so as to detect the positions of said R reference symbols in said digital data stream, said digital data stream being sampled with a period $T_e=T_s/N_e$, where $N_e$ is an integer not less than 2, and $T_s$ is the symbol time, wherein said cross-correlation is calculated every $T_e$ on successive frames, each calculated cross-correlation supplying a magnitude $I_n$ equal to:

$$I_n = \sum_{k=0}^{q-1} \left| \sum_{d=kr}^{(k+1)r-1} x_{n+dNe} S^*_{d,k} \right|$$

where $x_{n+dNe}$ represents the sample received at instant n+dNe, $S^*_{d,k}$ represents the complex conjugate of the reference symbol of index d, k ∈ {0, ..., R−1} and represents the frame index, r=R/q, where q is an integer not less than 1;

a summing circuit which sums said cross-correlations over M frames so as to form energy levels $J_{M,d}$ equal to:

$$J_{M,d} = \sum_{m=0}^{M-1} I_{mNe(R+I)+d}$$

where m is the frame index, M is the number of sums performed, and where d ∈ {0, ..., $N_e$(R+1)−1}; and a maximum energy level detector which detects a maximum energy level $J_{M,D}$ equal to $J_{M,D}$=MAX$_d$ $J_{M,d}$, the position D of the maximum energy level corresponding to the positions of said reference symbols in said received frames.

4. The apparatus according to claim 3, further comprising:

a synchronization tracking apparatus which receives the magnitudes $I_N$, said synchronization tracking apparatus tracking a rate of received samples.

* * * * *